April 6, 1965 HANS-WERNER A. BORG ETAL 3,176,711
VALVE MOUNTING AND NOVEL DISCONNECT CHECK
VALVE MEANS THEREFOR
Filed June 9, 1961
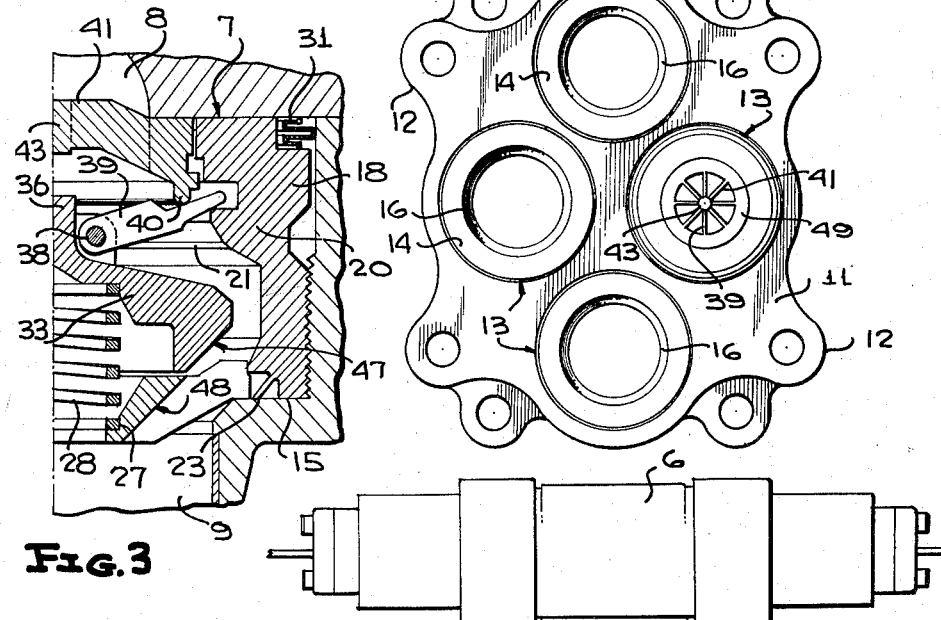
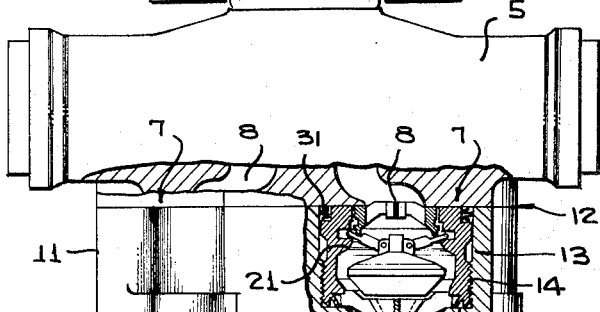
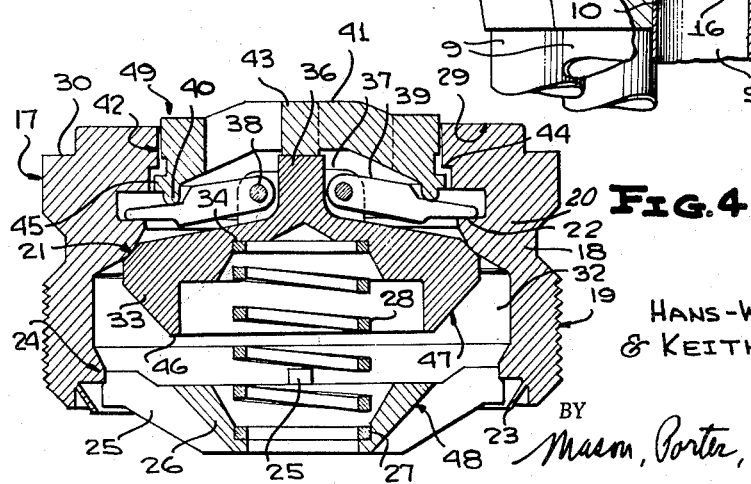
INVENTORS
HANS-WERNER A. BORG
& KEITH S. RODAWAY
BY Mason, Porter, Diller & Stewart
ATTORNEYS

United States Patent Office 3,176,711
Patented Apr. 6, 1965

3,176,711
VALVE MOUNTING AND NOVEL DISCONNECT CHECK VALVE MEANS THEREFOR
Hans-Werner A. Borg, Baldwin Park, and Keith S. Rodaway, Anaheim, Calif., assignors to Parker-Hannifin Corporation, Cleveland, Ohio, a corporation of Ohio
Filed June 9, 1961, Ser. No. 116,165
11 Claims. (Cl. 137—454.5)

The invention relates generally to valve means and primarily seeks to provide a novel check valve arrangement effective whenever a flow controlling valve such as a distributor valve or the like is removed from operative connection with its cooperating flow line or lines to automatically seal off said line or lines, thus to prevent outspilling of liquid, as well as any possible ingress of foreign matter.

It is known to provide flow control valves, such as distributor valves, and to mount them upon a support or base to which one or more flow lines are attached. Without special provision against such, as by use of special closure plugs, there may be an outspilling of liquid from the flow lines whenever the valves are removed from their supporting mountings, and there also is secondary danger of ingress of foreign matter into the flow lines. It is a purpose of the present invention to provide novel check valve means which will prevent these objectionable occurrences.

In its more detailed nature the invention seeks to provide a novel check valve means per se adapted for the stated purpose, and in combination, a supporting base, a valve unit removably mounted on the base, said base and valve unit having therein at least one set of flow passages disposed to communicate when the valve unit is mounted on the base, check valve means mounted on the base and effective whenever the valve unit is removed from the base to close off communication through the base flow passage, and means operable whenever the valve unit is mounted on the base to open the check valve means and provide for communication through the base and valve unit flow passages.

Another object of the invention is to provide a check valve means of the character stated which is spring seated and wherein the means for opening the check valve operates in opposition to the spring seating means and comprises a mechanical check valve unseating means contacting the check valve and which is movable by engagement of a part of the valve unit as it is being mounted on the base.

Another object of the invention is to provide a check valve arrangement of the character stated wherein a frusto-conical baffle is provided and placed to guide liquid flow about the check valve, the check valve including a frusto-conical portion disposed to form a continuation of the baffle when the check valve is in its open position.

Another object of the invention is to provide a check valve structure of the character stated wherein the baffle is fixedly mounted and the check valve is movable relatively thereto, the check valve seating spring means being supported on the baffle and interposed between the baffle and the check valve.

Another object of the invention is to provide a check valve arrangement of the character stated wherein there is included a member on the base and engageable and movable by a part of the valve unit as it is being mounted on the base, and means forming a movement imparting couple between said member and the check valve and effective to impart opening movement to the check valve as said member is moved by engagement of said valve unit part.

Another object of the invention is to provide a check valve structure of the character stated wherein the movement imparting couple includes movement compounding or multiplying devices whereby the movement imparted to the check valve is greater than the movement imparted by the valve unit part to the movement imparting member.

A further object of the invention is to provide a check valve structure of the character stated wherein there is included a readily mountable and removable casing or housing providing a chamber in which the check valve is movable and a seat against which said valve is seatable, the baffle and the movement imparting member being carried by said casing and comprising flow passing spider means, and the movement compounding devices being interposed between said member and the check valve.

A still further object of the invention is to provide a check valve structure of the character stated wherein the movement compound devices include a plurality of levers disposed in a generally horizontal position and radially and equidistantly about the central portion of the check valve and pivotally connected at their inner ends thereto, the outer ends of the levers resting as fulcra on an inwardly directed flange of the check valve casing, and wherein the movement imparting member includes a depending annular rib disposed to overlie and press against the levers at points closer to the fulcra contacts of the levers than the distance between said rib and lever contacts and the pivotal mountings of said levers on the check valve.

With the above and other objects in view that will hereinafter appear, the nature of the invention will be more clearly understood by reference to the following detailed description, the appended claims and the several views illustrated in the accompanying drawing:

In the drawing:

FIGURE 1 is a plan view illustrating the valve unit support or base with the valve unit removed therefrom, four check valve receiving bores being shown, and one check valve unit mounted in one of the bores.

FIGURE 2 is a side elevation illustrating the base of FIGURE 1 with a valve unit mounted thereon, parts being broken away to illustrate communicating flow passages and lines and a mounted check valve unit, the latter being shown in the check valve open condition.

FIGURE 3 is an enlarged fragmentary sectional view showing a check valve in open position as illustrated in FIGURE 2.

FIGURE 4 is an enlarged vertical cross section of a check valve unit, the check valve being shown in its closed or seated position.

In the example disclosure of the improved valve structure and part combination, there is shown a solenoid operated spool-type distributor valve generally designated 5 having thereon a solenoid operated pilot control 6 and including a plane bottom face 7 through which liquid flow ports 8 are projected. As will be apparent by reference to FIGURE 2, the flow ports in the valve 5 are adapted for connection with the flow lines 9 secured at 10 in the supporting base member 11 whereon the valve 5 is removably mounted at 12.

The base member 11 is provided with a plurality of check valve mounting bores 13. Each bore 13 is provided with an internally threaded portion 14 and terminates downwardly in an upwardly facing annular seat 15 through which a flow passage 16 opens upwardly from the respective flow line 9, as illustrated in FIGURE 2. A novel, spring seated, mechanical pressure opened check valve unit illustrated in detail in FIGURES 3 and 4 and generally designated 17, is mounted in each of the receiving bores 13 provided in the base.

Each of the check valve units includes a generally cylindrical shell 18 having an externally threaded portion 19 for threadable engagement with the internally threaded portion 14 of one of the mounting bores 13. The shell 18 includes an inwardly directed annular flange 20 shaped to provide a downwardly and inwardly facing annular narrow flat seat 21 and an upwardly facing annular abutment shoulder 22 disposed in a plane normal to the axis of the shell. The lower end extremity of the shell is formed to present an inwardly and downwardly inclined annular and flexible sealing lip 23 for engaging and sealing against the shell seat 15 as shown in FIGURES 2 and 3. The shell lower end also provides a seat or recess at 24 in which a spider 25 is press fitted, the same being provided centrally with a baffle cone ring 26.

The baffle cone ring is equipped with a counterbore or seat 27 in which to receive a compression spring 28.

The casing or shell 18 is dimensioned so that when properly mounted, as shown in FIGURES 2 and 4, its upper face 29 lies in the same plane with the top surface of the base or support 11, and the outer corner of the shell at the top is cut away as at 30 to provide a recess in which to receive a seal 31 engaged on the bottom shoulder defining the recess and against the undersurface or bottom face 7 of the valve 5 as indicated in FIGURES 2 and 3.

The shell 18 provides a chamber 32 in which to receive a poppet type check valve 33, said valve being vertically reciprocable centrally within said chamber. The check valve 33 is provided with a bore 34 in its undersurface which is aligned with the bottom spider seat 27 and serves to receive the upper end of the compression spring 28 which constantly tends to hold the valve 33 against its seat 21 in the manner illustrated in FIGURE 4.

A contact center or button 36 extends upwardly from the valve 33, and mounting ears 37 project radially outward therefrom and provide pivotal mountings at 38 and a plurality, four being shown, of equidistantly spaced, movement compounding levers 39 which project outwardly over and rest as fulcra upon the shell shoulder 22. The upper surfaces of the levers are engaged by a depressor rib or ring 40 which depends from a check valve opening member in the form of a spider 41 which is vertically reciprocable in a bore 42 provided at the upper end of the shell 18. The spider 41 has a central button portion engageable at its lower end with the contact button 36 projecting upwardly from the check valve 33 as shown in FIGURE 4. The bore 42 provides abutment shoulder means 44 which is engaged by a bottom flange 45 projecting outwardly from the spider 41, thereby to limit outward movement of the spider in the bore, and displacement outwardly from said bore.

By reference to FIGURES 2 and 3 it will be observed that the check valve 33, when open, will rest at its lower end extremity 46 upon, or lie closely adjacent, the baffle cone ring 27 with its frusto-coniform outer surface 47 forming a continuation of the frusto-conical baffle surface 47 of said ring.

It will be apparent that the upper and lower spiders 41 and 25, while serving as movement imparting means for valve opening purposes, and spring mounting purposes respectively, they also provide for flow passage through the check valve unit. It will also be noted that when the check valve is in closed position, illustrated in FIGURE 4, as when the unit is removed from its mounting, or when mounted as shown but with the valve 5 removed from the supporting base 11, the solid, upwardly presented annulus 49 of the upper spider 14 projects above the uppermost surface 29 of the shell as illustrated in FIGURE 4. Thus when the valve 5 is applied and secured upon the supporting base 11 as illustrated in FIGURE 2, its bottom face 7 will contact the spider surface 49 and depress the spider against the action of the spring 28, which constantly tends to seat the check valve 23. The parts are so proportioned that the central raised portion of the spider 41 can project upwardly into the respective overlying flow passage 8 of the valve.

It will be observed by reference to FIGURES 3 and 4 that the depending rib or ring 40 of the spider 41 overlies and presses against the levers 39 at points closer to the fulcra contacts thereof on the casing flange 20 than the distance between said rib and lever contacts and the pivotal mountings 38 of said levers on the check valve. Thereby the downward movement imparted to the check valve 33 by depression of the spider 41 and through said levers is compounded or multiplied and will be greater than the movement imparted by the valve unit part 7 to the spider or movement imparting member. In this manner, wide opening of the check valve, as shown in FIGURES 2 and 3, is effected by a relatively small depression of the spider 41.

The particular balanced arrangement of the check valve in its receiving casing avoids any objectionable deflection of the valve by pressure impact, and the improved valve arrangement avoids objectionable pressure drops. The particular relation of the frusto-coniform surfaces 48 and 47 on the baffle ring 26 and the check valve respectively also aids in assuring free flowing of liquid through the casing and flow passages and in avoiding objectionable displacements of the valve.

It will be apparent that when the check valve unit is properly mounted, as shown in FIGURES 2 and 3, the downwardly and inwardly angled sealing lip 23 will be resiliently pressed in sealing contact against the seating shoulder 15, and pressure of liquid in the flow passages, including the casing chamber 32, will act upon the lip and tend to increase its sealing contact against the seat 15.

The valve arrangement herein disclosed provides many advantages, among them being minimum loss of fluid in effecting connection and disconnection of the valve, the provision of a structure wherein minimum travel of the actuator or movement imparting member is required in the opening and closing of the poppet valve as compared to the relatively large opening provided by the movement compounding displacement of the valve from its seat. The novel design protects against closing of the check valve by fluid impingement by reducing the area subject to such impingement and also by reason of provision of positive force holding the check valve open, through linkage or lever means, rather than by employment of the usual spring means.

While preferred part and structure arrangements are disclosed in detail herein, it is to be understood that variations in specific structure and part arrangements may be made without departing from the spirit and scope of the invention as defined in the appended claims.

We claim:
1. In combination, a supporting base, a valve unit removably mounted on the base, said base and valve unit having therein at least one set of flow passages disposed to communicate when the valve unit is mounted on the base, check valve means mounted on the base and effective whenever the valve unit is removed from the base to close off communication through the base flow passage, a member on the base and engageable and movable by a part of the valve unit as it is being mounted on the base, and means forming a movement imparting couple between said member and the check valve and effective to impart opening movement to the check valve as said member is moved by engagement of said valve unit part, said last named means including a plurality of levers disposed in generally horizontal position and radially and equidistantly about the central portion of the check valve and pivotally connected at their inner ends to the check valve, an inwardly directed annular flange, the outer ends of the levers resting as fulcra on said flange, and said movement imparting member having a depending annular rib disposed inwardly of said flange in position to overlie and press against the levers at points closer to the fulcra contacts thereof on the flange than the distance between said rib and lever contacts and the pivotal mountings of said levers on the check valve, whereby the movement imparted to the check valve through said levers will be greater than the movement imparted by the valve unit part to said member in a direction for opening the check valve.

2. In combination, a supporting base, a valve unit removably mounted on the base, said base and valve unit having therein at least one set of flow passages disposed to communicate when the valve unit is mounted on the base, check valve means mounted on the base and effective whenever the valve unit is removed from the base to close off communication through the base flow passage, a member on the base and engageable and movable by a part of the valve unit as it is being mounted on the base, and means forming a movement imparting couple between said member and the check valve and effective to impart opening movement to the check valve as said member is moved by engagement of said valve unit part, said last named means including a plurality of levers disposed in generally horizontal position and radially and equidistantly about the central portion of the check valve and pivotally connected at their inner ends to the check valve, an inwardly directed annular flange, the outer ends of the levers resting as fulcra on said flange, and said movement imparting member having a depending annular rib disposed inwardly of said flange in position to overlie and press against the levers at points closer to the fulcra contacts thereof on the flange than the distance between said rib and lever contacts and the pivotal mountings of said levers on the check valve, whereby the movement imparted to the check valve through said levers will be greater than the movement imparted by the valve unit part to said member in a direction for opening the check valve, and said annular flange providing the seat for the check valve and being carried by a casing providing a chamber in which the check valve is movable and which is readily mountable on and removable from the base, the movement imparting member being guided for movement in the upper part of the casing and there being included a frusto-conical baffle fixed in the lower portion of the casing, said baffle and said movement imparting member being in the form of flow passing spiders, and said check valve having a frusto-conical portion disposed to form a continuation of the baffle when the check valve is in its open position.

3. A check valve unit comprising a generally cylindrical casing having an inwardly directed flange intermediately of the ends thereof and presenting an abutment shoulder toward one said end and a check valve seat toward the other of said ends, a poppet check valve endwise reciprocable in the casing and seatable on said seat, spring means constantly urging the check valve toward its seat, and means for displacing the check valve from its seat, said last named means including a movement imparting member guided for axial movement in said one end of the casing and presented at said one end for check valve actuating contact, means forming a movement imparting couple between said member and the check valve and including movement compounding devices engageable with said abutment shoulder for imparting to the check valve a greater amount of movement than the movement of actuation imparted to said member, said movement compounding devices comprise a plurality of levers disposed generally normal to the axis of the cylinder and radially and equidistantly spaced about a central portion of the check valve and pivotally connected at their inner ends to the check valve, the outer ends of the levers resting as fulcra on the abutment shoulder, and said movement imparting member having an annular rib disposed inwardly of the casing flange in position to overlie and press against the levers at points closer to the fulcra contacts thereof on the flange than the distance between said rib and lever contacts and the pivotal mountings of said levers on the check valve.

4. A check valve unit as defined in claim 3 wherein the movement compounding devices comprise a plurality of levers disposed generally normal to the axis of the cylinder and radially and equidistantly spaced about a central portion of the check valve and pivotally connected at their inner ends to the check valve, the outer ends of the levers resting as fulcra on the abutment shoulder, and said movement imparting member having an annular rib disposed inwardly of the casing flange in position to overlie and press against the levers at points closer to the fulcra contacts thereof on the flange than the distance between said rib and lever contacts and the pivotal mountings of said levers on the check valve, there also being included a frusto-conical baffle mounted on the casing and spaced endwise from said seat, and said check valve having a frusto-conical portion disposed to form a continuation of the baffle when the check valve is in its open position.

5. A check valve unit as defined in claim 3, there also being included a frusto-conical baffle mounted on the casing and spaced endwise from said seat, and said check valve having a frusto-conical portion disposed to form a continuation of the baffle when the check valve is in its open position, said baffle and said movement imparting member being in the form of flow passing spiders, and said spring means being interposed between one spider and the check valve and seated at its respective ends in the spider and in said check valve.

6. In combination, a supporting base, a valve unit removably mounted on the base, said base and valve unit having therein at least one set of flow passages disposed to communicate when the valve unit is mounted on the base, check valve means mounted on the base, and effective whenever the valve unit is removed from the base to close off communication through the base flow passage, a member on the base and engageable and movable by a part of the valve unit as it is being mounted on the base, and means forming a movement imparting couple between the member and the check valve and effective to impart opening movement to the check valve as said member is moved by engagement of said valve unit, said last named means including a plurality of levers disposed in generally horizontal position radially about the central portion of the check valve and pivotally connected at their inner ends to the check valve, a shell housing said check valve, the outer ends of the levers resting as fulcra on a portion of said shell, and said movement imparting member having means positioned to overlie and press against the levers between the inner and outer ends thereof whereby the movement imparted to the check valve through said levers operates in a direction for opening the check valve.

7. The combination as defined in claim 6 wherein the check valve is seated by spring seating means and the means for opening the check valve operates in opposition to the spring seating means.

8. The combination as defined in claim 6 wherein a frusto-conical baffle is mounted in the base flow passage and the check valve includes a frusto-conical portion positioned to form a continuation of the baffle when the check valve is in its open position.

9. The combination as defined in claim 6 wherein the check valve is seated by spring seating means and the means for opening the check valve operates in opposition to the spring seating means and comprises a mechanical check valve unseating means contacting the check valve and which is movable by engagement with a part of the valve unit as it is being mounted on the base, there also being included a frusto-conical baffle mounted on the base, and said check valve having a frusto-conical portion disposed to form a continuation of the baffle when the check valve is in its open position.

10. The combination as defined in claim 6 wherein the means positioned to overlie and press against the levers between the inner and outer ends thereof is a depending annular rib which is disposed inwardly of the portion of said shell upon which the outer ends of the levers rest in a position to overlie and press against the levers at points close to the fulcra contacts thereof on the shell portion than the distance between said rib and lever contacts and the pivotal mountings of said levers on the check valve.

11. The combination as defined in claim 6 wherein the portion of said shell upon which the outer ends of the levers rest as fulcra is an inwardly directed annular flange.

References Cited by the Examiner

UNITED STATES PATENTS

| | | | |
|---|---|---|---|
| 2,309,709 | 2/43 | Paille | 251—242 X |
| 2,441,075 | 5/48 | Krapp | 284—19 |
| 2,462,512 | 2/49 | Krone et al. | 284—18.7 |
| 2,665,926 | 1/54 | Fraser | 137—614.02 |
| 2,753,884 | 7/56 | Lindsay | 284—18.6 X |

ISADOR WEIL, *Primary Examiner.*

M. M. FRITZ, *Examiner.*